US012601714B2

(12) United States Patent
Gu et al.

(10) Patent No.: US 12,601,714 B2
(45) Date of Patent: Apr. 14, 2026

(54) MODULAR WHEELED MOBILE ULTRASONIC STRUCTURE DETECTION APPARATUS AND DETECTION METHOD

(71) Applicants: SOUTH CHINA UNIVERSITY OF TECHNOLOGY, Guangzhou City (CN); TONGJI UNIVERSITY, Shanghai City (CN)

(72) Inventors: Renguo Gu, Guangzhou City (CN); Yingguang Fang, Guangzhou City (CN); Hehua Zhu, Shanghai City (CN); Wei Wu, Shanghai City (CN); Junsheng Chen, Guangzhou City (CN); Xiaobin Ding, Guangzhou City (CN)

(73) Assignees: SOUTH CHINA UNIVERSITY OF TECHNOLOGY, Guangzhou City (CN); TONGJI UNIVERSITY, Shanghai City (CN)

( * ) Notice: Subject to any disclaimer, the term of this patent is extended or adjusted under 35 U.S.C. 154(b) by 274 days.

(21) Appl. No.: 18/554,470

(22) PCT Filed: Jul. 16, 2021

(86) PCT No.: PCT/CN2021/106827
§ 371 (c)(1),
(2) Date: Oct. 8, 2023

(87) PCT Pub. No.: WO2022/213509
PCT Pub. Date: Oct. 13, 2022

(65) Prior Publication Data
US 2024/0192174 A1 Jun. 13, 2024

(30) Foreign Application Priority Data

Apr. 7, 2021 (CN) .......................... 202110369976.6

(51) Int. Cl.
*G01N 29/24* (2006.01)
*G01N 29/06* (2006.01)

(52) U.S. Cl.
CPC ....... *G01N 29/069* (2013.01); *G01N 29/2493* (2013.01); *G01N 2291/0289* (2013.01); *G01N 2291/106* (2013.01)

(58) Field of Classification Search
CPC ................................................ G01N 29/2493
See application file for complete search history.

(56) References Cited

U.S. PATENT DOCUMENTS

| | | | | | |
|---|---|---|---|---|---|
| 4,202,216 | A | * | 5/1980 | Bull ........................... | F17D 3/00 |
| | | | | | 73/639 |
| 6,055,862 | A | * | 5/2000 | Martens ................. | G01N 29/28 |
| | | | | | 73/635 |

(Continued)

FOREIGN PATENT DOCUMENTS

| | | |
|---|---|---|
| CN | 201464432 | 5/2010 |
| CN | 102608217 | 7/2012 |

(Continued)

*Primary Examiner* — Alexander A Mercado
(74) *Attorney, Agent, or Firm* — JMB Davis Ben-David

(57) ABSTRACT

A modular wheeled mobile ultrasonic structure detection apparatus is disclosed, including a mobile detection platform, at least one ultrasonic detection roller, at least one ultrasonic sensor, and a steering balance mechanism including a connecting arm and at least one balancing apparatus; the balancing apparatus includes a balancing cylinder hinged to the connecting arm, a balancing spring provided in the balancing cylinder, and a steering linkage hinged to the mobile detection platform, a piston being connected to one end of the steering linkage away from the mobile detection platform and the balancing spring being in contact with the piston; and the piston can move along a length direction of the balancing cylinder and thereby define a direction of the steering linkage. When the structure surface fluctuates, (Continued)

bends, or turns, the mobile detection platform can rotate relative to the connecting arm to change the moving posture to adapt to various complex detection conditions. A mobile carrier can pull the detection apparatus in a moving state to realize the non-contact continuous acquisition of ultrasonic waves between the ultrasonic sensor and the structure surface.

9 Claims, 5 Drawing Sheets

(56)                References Cited

U.S. PATENT DOCUMENTS

| 10,766,510 | B1 * | 9/2020 | Pagano | G01N 29/069 |
| 2001/0032513 | A1 * | 10/2001 | Havira | G01B 17/00 |
| | | | | 73/639 |
| 2013/0047730 | A1 * | 2/2013 | Wigh | G01N 29/265 |
| | | | | 73/636 |
| 2014/0007689 | A1 * | 1/2014 | Bond-Thorley | G01N 29/265 |
| | | | | 73/618 |
| 2017/0108473 | A1 * | 4/2017 | Bestebreurtje | G01N 29/28 |
| 2019/0025258 | A1 * | 1/2019 | Guibert | G01N 29/0645 |
| 2019/0285590 | A1 * | 9/2019 | Hirokawa | G01N 29/2493 |
| 2020/0172184 | A1 * | 6/2020 | Abdellatif | B62D 61/12 |
| 2021/0341431 | A1 * | 11/2021 | Abdellatif | G01N 29/221 |
| 2022/0170889 | A1 * | 6/2022 | Abdellatif | G01N 29/04 |
| 2022/0176736 | A1 * | 6/2022 | Abdellatif | G01N 29/265 |

FOREIGN PATENT DOCUMENTS

| CN | 102673607 | 9/2012 |
| CN | 202533414 | 11/2012 |
| CN | 103091399 | 5/2013 |
| CN | 204226549 | 3/2015 |
| CN | 205025461 | 2/2016 |
| CN | 106555585 | 4/2017 |
| CN | 106596731 | 4/2017 |
| CN | 106896157 | 6/2017 |
| CN | 107764902 | 3/2018 |
| CN | 210401320 | 4/2020 |
| CN | 111085446 | 5/2020 |
| CN | 211756910 | 10/2020 |
| CN | 112326789 | 2/2021 |
| GB | 985942 | 3/1965 |

* cited by examiner

MODULAR WHEELED MOBILE ULTRASONIC STRUCTURE DETECTION APPARATUS AND DETECTION METHOD

CROSS-REFERENCE TO RELATED APPLICATIONS

This is the US National Stage of International Application No. PCT/CN2021/106827, filed on Jul. 16, 2021, which claims priority to Chinese Patent Application No. 202110369976.6, filed on Apr. 7, 2021.

FIELD OF THE INVENTION

The present disclosure relates to a modular wheeled mobile ultrasonic structure detection apparatus and detection method.

BACKGROUND OF THE INVENTION

As the main equipment of ultrasonic detection, an ultrasonic detector functions in detecting structures by transmitting ultrasonic waves through an ultrasonic detection probe, and amplifying electric signals sent back by the ultrasonic detection probe before displaying them in a certain way, thereby obtaining information of whether there are defects in the detected materials as well as positions and sizes of the defects.

Existing ultrasonic detection probes mainly include sliding shoe type probes and wheeled probes. The sliding shoe type probe is composed of an ultrasonic probe and a sled. A plurality of ultrasonic probes are embedded in the sled at different angles and the ultrasonic probe slides along a structure surface with the sled during detection. The sliding shoe type probe can contact the structure surface relatively close to shorten an acoustic path outside the structure surface to the maximum extent, thereby realizing high-speed ultrasonic detection.

The wheeled probe is also called a wheeled transducer or a probe wheel. The wheeled probe generally includes a probe support and a probe wheel outer membrane; the probe support is mounted on a wheel shaft for fixing the ultrasonic probe, and the probe wheel outer membrane is made of an acoustically transparent resin material for wrapping acoustically transparent coupling liquid in the whole inner cavity. As the wheeled probe continues to roll over the structure surface, uninterrupted detection of the structure can be achieved.

In the early days, the sliding shoe type probe prevailed due to the backward design, manufacturing techniques, and poor adaptability of the wheeled probe. In recent decades, the wheeled probe has gradually become mainstream again as the quality has been significantly improved.

However, when the structure surface fluctuates, bends, or turns during the movement, the existing ultrasonic detector with the wheeled probe is difficult to ensure that the ultrasonic detector can completely follow the changes of the structure surface and change the moving posture, so it is difficult to adapt to the structure surface with complex conditions.

SUMMARY OF THE INVENTION

An object of the present disclosure is to provide a modular wheeled mobile ultrasonic structure detection apparatus.

Another object of the present disclosure is to provide a modular wheeled mobile ultrasonic structure detection method.

In view of the above object, the present disclosure adopts the following technical solutions.

A modular wheeled mobile ultrasonic structure detection apparatus is configured to be pulled by a mobile carrier to move on a structure surface and perform ultrasonic detection of a structure defect in a moving state, and the modular wheeled mobile ultrasonic structure detection apparatus includes:

a mobile detection platform;

at least one ultrasonic detection roller connected to the mobile detection platform, an interior of the ultrasonic detection roller being filled with ultrasonic transmission medium oil;

at least one ultrasonic sensor provided corresponding to at least one ultrasonic detection roller, the ultrasonic sensor being provided inside the ultrasonic detection roller and soaked in the ultrasonic transmission medium oil; and a steering balance mechanism connected to the mobile detection platform, the steering balance mechanism including a connecting arm hinged to the mobile detection platform and at least one balancing apparatus hinged to the connecting arm, the balancing apparatus being hinged to the mobile detection platform, and the mobile detection platform being connected to the mobile carrier via the connecting arm.

The balancing apparatus includes a balancing cylinder hinged to the connecting arm, a balancing spring provided in the balancing cylinder, and a steering linkage hinged to the mobile detection platform, a piston being connected to one end of the steering linkage away from the mobile detection platform and the balancing spring being in contact with the piston; and the piston can move along a length direction of the balancing cylinder and thereby define a direction of the steering linkage.

Further, at least one sprinkler connected to the mobile detection platform is included, the sprinkler being configured to spray water onto the structure surface.

Further, the ultrasonic detection roller rotates around a roller shaft, the roller shaft does not rotate with the ultrasonic detection roller, and the ultrasonic sensor is fixed to the roller shaft to keep a mounting direction thereof unchanged.

Further, at least one ultrasonic signal processor mounted to the roller shaft is included.

Further, a plurality of ultrasonic detection rollers are provided, and a plurality of ultrasonic sensors and a plurality of ultrasonic signal processors are provided corresponding to the ultrasonic detection rollers.

The ultrasonic detection roller includes a first ultrasonic detection roller and a second ultrasonic detection roller; the ultrasonic sensor correspondingly includes a first ultrasonic sensor and a second ultrasonic sensor, the first ultrasonic sensor being configured to transmit and receive ultrasonic waves, and the second ultrasonic sensor being configured to receive only the ultrasonic waves.

The ultrasonic signal processor correspondingly includes a first ultrasonic signal processor and a second ultrasonic signal processor, the first ultrasonic signal processor being configured to transmit and receive ultrasonic signals, and the second ultrasonic signal processor being configured to receive only the ultrasonic signals.

Further, the plurality of ultrasonic detection rollers are arranged in a single column or multiple columns to form an array distribution, so that the ultrasonic sensors also form an array distribution; the ultrasonic sensors of the array distribution are adapted to successively acquire information of ultrasonic echoes of different amplitudes and phases at different positions of a structure under traction of the mobile carrier, to form an ultrasonic detection image of a whole structure or a wide range of the structure.

Further, the ultrasonic detection rollers are connected to the mobile detection platform via roller displacement adjustment mechanisms, the roller displacement adjustment mechanisms including a first sleeve connected to the mobile detection platform, a second sleeve connected to the ultrasonic detection roller, and a displacement adjustment spring confined between the first sleeve and the second sleeve, and the second sleeve being connected to the roller shaft, so that the ultrasonic detection roller is always in close contact with the structure surface under elastic force of the displacement adjustment spring.

Further, the mobile detection platform is provided with a first rotary support, and the connecting arm is hinged with the first rotary support via a first rotary pin.

Two balancing apparatuses are provided, which are hinged to two ends of the connecting arm; two ends of the connecting arm are provided with two second rotary supports, respectively, and two balancing cylinders are hinged with the two second rotary supports via second rotary pins.

In an initial state, the two balancing apparatuses are symmetrical about a central axis of the connecting arm.

Further, a plurality of guide wheels connected to and located at two ends of the mobile detection platform are further included; at each end of the mobile detection platform, the guide wheels are arranged in single, single row, or multiple rows, the guide wheels being connected to the mobile detection platform through guide wheel-platform linkages with a predetermined length to guide movement of the mobile detection platform and define a distance between the mobile detection platform and the structure surface.

In order to achieve the above objects, the present disclosure further provides the following technical solutions.

A modular wheeled mobile ultrasonic structure detection method includes the following steps:

providing the above modular wheeled mobile ultrasonic structure detection apparatus;

pulling the modular wheeled mobile ultrasonic structure detection apparatus by a mobile carrier to enable the modular wheeled mobile ultrasonic structure detection apparatus to move on a structure surface, and adjusting the moving posture of a mobile detection platform by a steering balance mechanism to adapt to different structure surfaces;

performing ultrasonic detection on a structure defect through an ultrasonic detection roller installed with an ultrasonic sensor under a moving state, and transmitting ultrasonic waves through ultrasonic transmission medium oil, to realize non-contact continuous acquisition of the ultrasonic waves between the ultrasonic sensor and the structure surface; and signals of ultrasonic echo obtained by detection being used for identification of defects inside the structures.

The present disclosure has the following beneficial effects: when the structure surface fluctuates, bends, or turns, the mobile detection platform can rotate relative to the connecting arm to change the moving posture to adapt to various complex detection conditions.

Figure 1:
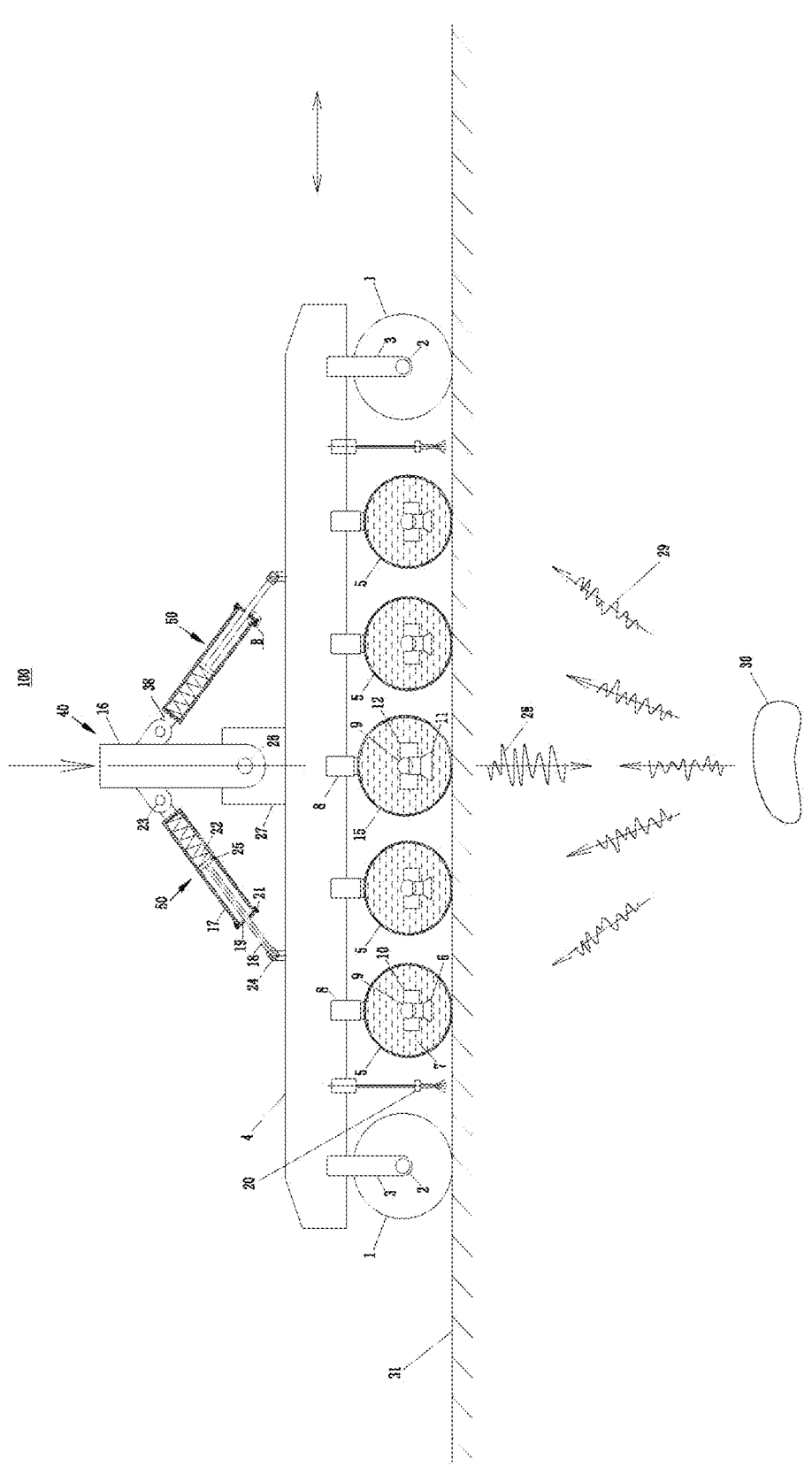
FIG. 1 is a front view of a modular wheeled mobile ultrasonic structure detection apparatus of the present disclosure.

Label declaration of drawings: 100, detection apparatus; 1, guide wheel; 2, guide wheel bearing; 3, guide wheel-platform linkage; 4, mobile detection platform; 5, second ultrasonic detection roller; 6, second ultrasonic sensor; 7, ultrasonic transmission medium oil; 8, roller displacement adjustment mechanism; 9, roller shaft; 10, second ultrasonic signal processor; 11, first ultrasonic sensor; 12, first ultrasonic signal processor; 13, first sleeve; 14, displacement adjustment spring; 15, first ultrasonic detection roller; 16, connecting arm; 17, balancing cylinder; 18, steering linkage; 19, cylinder head; 20, sprinkler; 21, washer; 22, balancing spring; 23, second rotary pin; 24, third rotary pin; 25, piston; 26, first rotary pin; 27, rotary support; 28, ultrasonic detection wave; 29, ultrasonic echo; 30, structure defect; 31, structure surface; 32, second sleeve; 33, mounting portion; 34, bolt; 35, sealing ring; 36, sealing loop; 37, cylinder block; 38, connecting portion; 39, vent; 40, steering balance mechanism; and 50, balancing apparatus.

DETAILED DESCRIPTION OF THE EMBODIMENTS

To facilitate a better understanding of the objects, structures, features, and functions of the present disclosure, the present disclosure is further explained in combination with the accompanying drawings and specific implementations. It should be noted that the features illustrated in the drawings are not necessarily drawn to scale. Furthermore, the described embodiments are not all but only part of the embodiments of the present disclosure. All other embodiments, obtained by those ordinarily skilled in the art based on the described embodiments in the present disclosure without creative work, shall fall within the scope of protection of the present disclosure.

Unless defined otherwise, the technical or scientific terms used in the present disclosure shall have the ordinary meaning as understood by the ordinary skilled in the art to which the present disclosure belongs. The use of "first", "second", and the like in the present disclosure does not denote any order, quantity, or importance, but rather is used to distinguish between different components. "Connected to", "connected with", or the like are not limited to physical or mechanical connections, but may include electrical connections, whether direct or indirect. The terms "upper", "lower", "left", "right", "front", "back", and the like are used only to indicate relative positional relationships that may change accordingly when the absolute position of the object being described changes. Further, in the description of the present disclosure, "a plurality of" means two or more than two unless otherwise specified.

Figure 2:
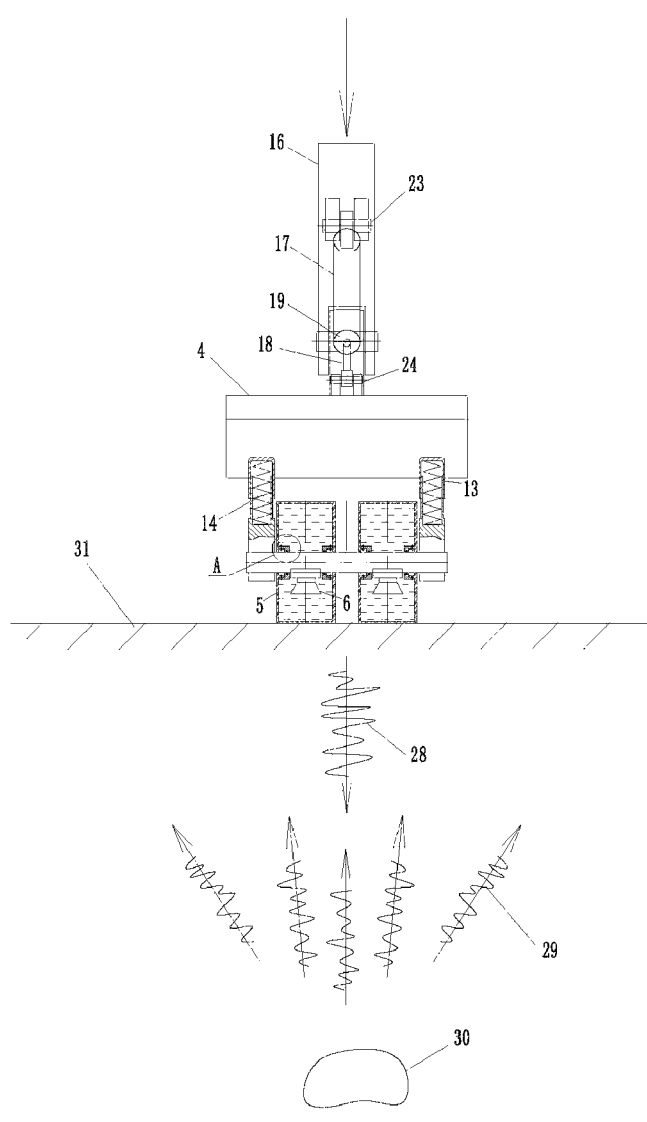
FIG. 2 is a side view of FIG. 1.

As shown in FIGS. 1 and 2, a modular wheeled mobile ultrasonic structure detection apparatus 100 according to an embodiment of the present disclosure is configured to be pulled by a mobile carrier to move on a structure surface 31 and perform ultrasonic detection of a structure defect 30 in a moving state, such as ultrasonic flaw detection. The mobile carrier may be a detection vehicle or other mobile apparatus. According to the need for detection, the structure surface 31 may be the surface of a rail or the surface of other structures to be detected.

The detection apparatus 100 includes a mobile detection platform 4, an ultrasonic detection roller connected to the mobile detection platform 4, an ultrasonic sensor arranged corresponding to the ultrasonic detection roller, and a steering balance mechanism 40 connected to the mobile detection platform 4. The ultrasonic detection roller and the ultrasonic sensor may be provided with one or more as required.

The ultrasonic sensor may have the ability to transmit or receive ultrasonic waves or may have both the ability to transmit and receive ultrasonic waves, as desired. The interior of the ultrasonic detection roller is filled with ultrasonic transmission medium oil 7; the ultrasonic sensor is provided in the interior of the ultrasonic detection roller and is soaked in the ultrasonic transmission medium oil 7, to transmit ultrasonic waves through the ultrasonic transmission medium oil 7 and realize non-contact continuous acquisition of the ultrasonic waves between the ultrasonic sensor and the structure surface 31. The steering balance mechanism 40 is adapted to be connected to the mobile carrier, the steering balance mechanism 40 being configured to enable the mobile detection platform 4 to change the moving posture to accommodate different structure surfaces 31.

The steering balance mechanism 40 includes a connecting arm 16 hinged to the mobile detection platform 4 and a balancing apparatus 50 hinged to the connecting arm 16, the balancing apparatus 50 being further hinged with the mobile detection platform 4, and the mobile detection platform 4 being connected to the mobile carrier via the connecting arm 16. The balancing apparatus 50 may be provided with one or more as required.

The balancing apparatus 50 includes a balancing cylinder 17 hinged to the connecting arm 16, a balancing spring 22 provided in the balancing cylinder 17, and a steering linkage 18 hinged to the mobile detection platform 4; a piston 25 is connected to one end of the steering linkage 18 away from the mobile detection platform 4, and the balancing spring 22 is in contact with the piston 25 to apply a spring force to the piston 25, and the piston 25 can move along the length direction of the balancing cylinder 17 and thereby define the direction of the steering linkage 18.

When the structure surface 31 fluctuates, bends, or turns, the mobile detection platform 4 can rotate relative to the connecting arm 16 to change the moving posture to adapt to various complex detection conditions. When the mobile detection platform 4 rotates, the piston 25 can move along the length direction of the balancing cylinder 17, and the balancing spring 22 is correspondingly compressed or extended, so that the relative position between the linkage and the balancing cylinder 17 changes to adapt to the rotation of the mobile detection platform 4, and the balancing spring 22 can also function as energy storage and shock absorption.

The detection apparatus 100 may also include a sprinkler 20 connected to the mobile detection platform 4, and the sprinkler 20 may be provided with one or more. The sprinkler 20 is configured to spray water onto the structure surface 31, thereby reducing the energy reflection of ultrasonic waves at the interface.

The ultrasonic detection roller rotates around the roller shaft 9, the roller shaft 9 does not rotate with the ultrasonic detection roller, and the ultrasonic sensor is fixed to the roller shaft 9 to keep its mounting direction unchanged, thereby keeping its mounting direction most favorable for ultrasonic transmission and reception.

Figure 3:
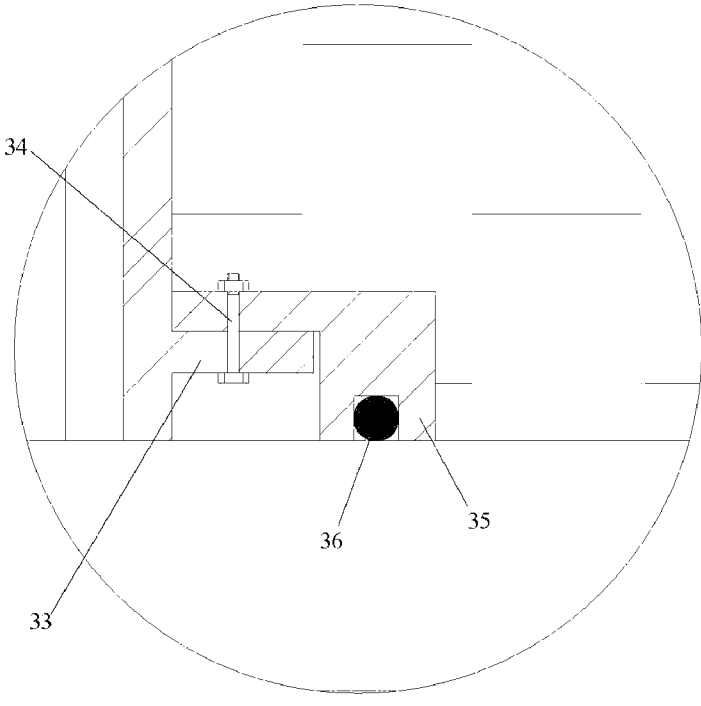
FIG. 3 is an enlargement view at A in FIG. 2.

As shown in FIGS. 2 and 3, a mounting portion 33 is provided on two sides of the interior of the ultrasonic detection roller; a sealing ring 35 is mounted on the mounting portion 33 via a bolt 34; a through hole is formed in the middle of the sealing ring 35 for the roller shaft 9 to pass through; and a sealing loop 36 is further provided between the sealing ring 35 and the roller shaft 9. By the arrangement of the sealing ring 35 and the sealing loop 36, a good sealing action is formed between the ultrasonic detection roller and the roller shaft 9.

The detection apparatus 100 may also include an ultrasonic signal processor mounted on the roller shaft 9 so that the ultrasonic signal may be locally encoded into a digital signal for transmission to enhance the environmental electromagnetic interference resistance of the ultrasonic detection process.

A plurality of ultrasonic detection rollers are provided, and a plurality of ultrasonic sensors and a plurality of ultrasonic signal processors are provided corresponding to the ultrasonic detection rollers. The ultrasonic detection roller includes a first ultrasonic detection roller 15 and a plurality of second ultrasonic detection rollers 5; the first ultrasonic detection roller 15 is arranged at an intermediate position, and the plurality of second ultrasonic detection rollers 5 are distributed on two sides of the first ultrasonic detection roller 15. The ultrasonic sensor correspondingly includes a first ultrasonic sensor 11 and a plurality of second ultrasonic sensors 6, namely, the first ultrasonic sensor 11 is mounted on the first ultrasonic detection roller 15, and the second ultrasonic sensors 6 are mounted on the second ultrasonic detection rollers 5. The first ultrasonic sensor 11 is an ultrasonic transmission and reception sensor that integrates ultrasonic transmission and reception and is used for transmitting and receiving ultrasonic waves, and the second ultrasonic sensor 6 is an ultrasonic reception sensor that is used only for receiving ultrasonic waves. As shown in FIGS. 1 and 2, the first ultrasonic sensor 11 emits ultrasonic detection waves 28, and ultrasonic echoes 29 returned via structure defects 30 are received by the first ultrasonic sensor 11 and the second ultrasonic sensor 6.

The ultrasonic signal processor correspondingly includes a first ultrasonic signal processor 12 and a plurality of second ultrasonic signal processors 10, namely, the first ultrasonic signal processor 12 is mounted on the first ultrasonic detection roller 15, and the second ultrasonic signal processors 10 are mounted on the second ultrasonic detection rollers 5. The first ultrasonic signal processor 12 is an ultrasonic signal transmission and reception processor for transmitting and receiving an ultrasonic signal, and the second ultrasonic signal processor 10 is an ultrasonic signal receiving processor only for receiving an ultrasonic signal.

The plurality of ultrasonic detection rollers are arranged in a single column or multiple columns to form an array distribution so that the ultrasonic sensors also form an array distribution; the ultrasonic sensors of the array distribution are adapted to successively acquire the information of ultrasonic echoes 29 of different amplitudes and phases at different positions of a structure under traction of the mobile carrier, to form an ultrasonic detection image of a whole structure or a wide range of the structure.

Figure 5:
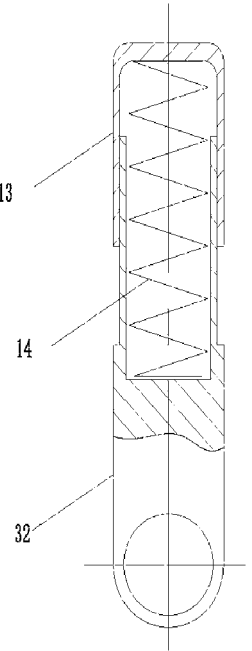
FIG. 5 is a structural diagram of a roller displacement adjustment mechanism.

As shown in FIGS. 2 and 5, the ultrasonic detection roller is connected to the mobile detection platform 4 via a roller displacement adjustment mechanism 8; the roller displacement adjustment mechanism 8 includes a first sleeve 13 connected to the mobile detection platform 4, a second sleeve 32 connected to the ultrasonic detection roller, and a displacement adjustment spring 14 confined between the first sleeve 13 and the second sleeve 32; the displacement adjustment spring 14 can apply a spring force to the second sleeve 32; since the second sleeve 32 is connected to the roller shaft 9, the ultrasonic detection roller is in turn connected to the roller shaft 9, the ultrasonic detection roller may be subjected to the spring force of the displacement adjusting spring 14 such that the ultrasonic detection roller is always in close contact with the structure surface 31 under the elastic force of the displacement adjusting spring 14.

The mobile detection platform 4 is provided with a first rotary support 27, and the connecting arm 16 is hinged with the first rotary support 27 via a first rotary pin 26. Two balancing apparatuses 50 are provided, which are hinged to two ends of the connecting arm 16. The two ends of the connecting arm 16 are provided with two second rotary supports 27, respectively, and the two balancing cylinders 17 are hinged with the two second rotary supports 27 via the second rotary pins 23. The steering linkage 18 is hinged with the mobile detection platform 4 by a third rotary pin 24.

In the initial state (that is, with the mobile detection platform 4 on the horizontal structure surface 31), the two balancing apparatuses 50 are symmetrical about the central axis of the connecting arm 16. When the structure surface 31 fluctuates, bends, or turns, the mobile detection platform 4 can rotate about the first rotary pin 26 to change the moving posture (including the direction of motion) to adapt to various complex detection conditions. The provision of two balancing apparatuses 50 provides a better balancing effect of the mobile detection platform 4 and a better shock absorption effect so that the mobile detection platform 4 moves more smoothly.

Figure 4:
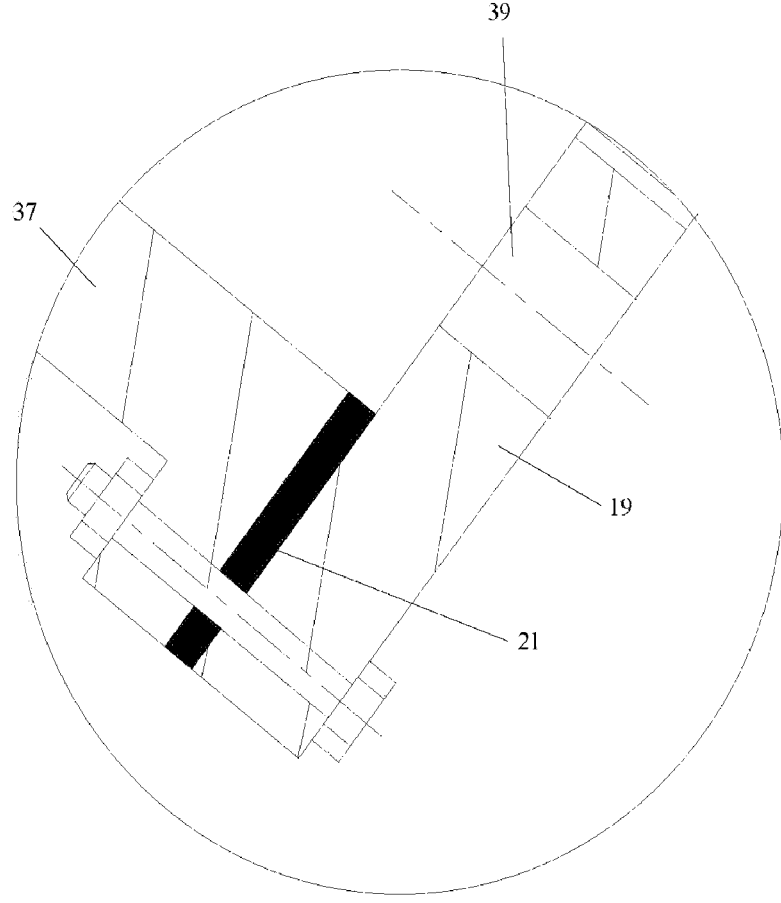
FIG. 4 is an enlargement view at B in FIG. 1.

As shown in FIGS. 1 and 4, the balancing cylinder 17 includes a cylinder block 37, one end of the cylinder block 37 is connected to the cylinder head 19, and the other end thereof is provided with a connecting portion 38 hinged with the second rotary support 27. A washer 21 is provided between the cylinder block and the cylinder head 19. The steering linkage 18 extends through the cylinder head 19 into the interior of the cylinder block 37. The cylinder head 19 is further provided with a vent communicating with the interior of the cylinder block.

The detection apparatus 100 may further include a plurality of guide wheels 1 connected to the mobile detection platform 4 and located at two ends of the mobile detection platform 4, and guide wheel bearings 2 are provided on the sides of the guide wheels 1. At each end of the mobile detection platform 4, the guide wheels 1 are arranged in single, single row, or multiple rows, the guide wheels 1 being connected to the mobile detection platform 4 through guide wheel-platform linkages 3 with a predetermined length to guide movement of the mobile detection platform 4 and define a distance between the mobile detection platform 4 and the structure surface 31.

The modular wheeled mobile ultrasonic structure detection method according to an embodiment of the present disclosure includes the following steps: using the above modular wheeled mobile ultrasonic structure detection apparatus 100; pulling the modular wheeled mobile ultrasonic structure detection apparatus 100 by a mobile carrier to enable the modular wheeled mobile ultrasonic structure detection apparatus 100 to move on a structure surface 31, and adjusting a moving posture of a mobile detection platform 4 by a steering balance mechanism 40 to adapt to different structure surfaces 31; performing ultrasonic detection on a structure defect 30 through an ultrasonic detection roller installed with an ultrasonic sensor under a moving state, and transmitting ultrasonic waves through ultrasonic transmission medium oil 7, to realize non-contact continuous acquisition of the ultrasonic waves between the ultrasonic sensor and the structure surface 31; and signals of ultrasonic echo 29 obtained by detection being used for identification of defects inside the structures.

The above detailed description is only a description of the better embodiment of the present disclosure and does not therefore limit the scope of the patent of the present disclosure. Therefore, any equivalent technical changes made using the content of the present disclosure are included in the scope of the patent of the present disclosure.

The invention claimed is:

1. A modular wheeled mobile ultrasonic structure detection apparatus configured to be pulled by a mobile carrier to move on a structure surface and perform ultrasonic detection of a structure defect in a moving state, wherein the modular wheeled mobile ultrasonic structure detection apparatus comprises:

a mobile detection platform extending along a rectilinear direction;

a plurality of ultrasonic detection rollers connected to the mobile detection platform along the rectilinear direction and in rolling contact with the structure surface, an interior of the ultrasonic detection rollers being filled with ultrasonic transmission medium oil, and rotation axes of the ultrasonic detection rollers being perpendicular to the rectilinear direction;

a plurality of ultrasonic sensors provided corresponding to the plurality of ultrasonic detection rollers, each ultrasonic sensor being provided inside each corresponding ultrasonic detection roller and soaked in the ultrasonic transmission medium oil; and a steering balance mechanism connected to the mobile detection platform, the steering balance mechanism comprising a connecting arm hinged to the mobile detection platform and two balancing apparatuses hinged to two sides of the connecting arm along the rectilinear direction, each balancing apparatus being hinged to the mobile detection platform, and the mobile detection platform being connected to the mobile carrier via the connecting arm, wherein each balancing apparatus comprises a balancing cylinder hinged to the connecting arm, a balancing spring provided in the balancing cylinder, and a steering linkage hinged to the mobile detection platform, a piston being connected to one end of the steering linkage away from the mobile detection platform and the balancing spring being in contact with the piston; the piston can move along a length direction of the balancing cylinder and thereby define a direction of the steering linkage;

the mobile detection platform is provided with a first rotary support, and the connecting arm is hinged with the first rotary support via a first rotary pin; two ends of the connecting arm are each provided with a second rotary supports, and two balancing cylinders are hinged with the two second rotary supports via second rotary pins;

in an initial state, the two balancing apparatuses are symmetrical about a central axis of the connecting arm; and hinging of the connecting arm with the mobile detection platform enables the mobile detection platform to rotate relative to the connecting arm about a hinged axis such that the balancing spring can correspondingly compress or extend, to accommodate rotation of the mobile detection platform, the hinged axis being perpendicular to the rectilinear direction and parallel to the rotation axes of the ultrasonic detection rollers.

2. The modular wheeled mobile ultrasonic structure detection apparatus according to claim 1, further comprising at least one sprinkler connected to the mobile detection platform, the sprinkler being configured to spray water onto the structure surface.

3. The modular wheeled mobile ultrasonic structure detection apparatus according to claim 1, further comprising a plurality of roller shafts arranged corresponding to the plurality of ultrasonic detection rollers, each ultrasonic detection roller rotating around the corresponding roller shaft, the roller shafts not rotating with the ultrasonic detection rollers, and the ultrasonic sensors being fixed to the roller shafts to keep mounting directions thereof unchanged.

4. The modular wheeled mobile ultrasonic structure detection apparatus according to claim 3, further comprising a plurality of ultrasonic signal processors arranged corresponding to the plurality of roller shafts, the ultrasonic signal processors being mounted to the corresponding roller shafts.

5. The modular wheeled mobile ultrasonic structure detection apparatus according to claim 4, wherein the ultrasonic detection roller comprises a first ultrasonic detection roller and a second ultrasonic detection roller; the ultrasonic sensor correspondingly comprises a first ultrasonic sensor and a second ultrasonic sensor, the first ultrasonic sensor being configured to transmit and receive ultrasonic waves, and the second ultrasonic sensor being configured to receive only the ultrasonic waves; and the ultrasonic signal processor correspondingly comprises a first ultrasonic signal processor and a second ultrasonic signal processor, the first ultrasonic signal processor being configured to transmit and receive ultrasonic signals, and the second ultrasonic signal processor being configured to receive only the ultrasonic signals.

6. The modular wheeled mobile ultrasonic structure detection apparatus according to claim 5, wherein the plurality of ultrasonic detection rollers are arranged in a single column or multiple columns to form an array distribution, so that the ultrasonic sensors also form an array distribution; the ultrasonic sensors of the array distribution are adapted to successively acquire information of ultrasonic echoes of different amplitudes and phases at different positions of a structure under traction of the mobile carrier, to form an ultrasonic detection image of a whole structure.

7. The modular wheeled mobile ultrasonic structure detection apparatus according to claim 3, wherein the ultrasonic detection rollers are connected to the mobile detection platform via roller displacement adjustment mechanisms, the roller displacement adjustment mechanisms comprising a first sleeve connected to the mobile detection platform, a second sleeve connected to the ultrasonic detection roller, and a displacement adjustment spring confined between the first sleeve and the second sleeve, and the second sleeve being connected to the roller shaft, so that the ultrasonic detection roller is always in close contact with the structure surface under elastic force of the displacement adjustment spring.

8. The modular wheeled mobile ultrasonic structure detection apparatus according to claim 1, further comprising a plurality of guide wheels connected to and located at two ends of the mobile detection platform, wherein at each end of the mobile detection platform, the guide wheels are arranged in single, single row, or multiple rows, the guide wheels being connected to the mobile detection platform through guide wheel-platform linkages with a predetermined length to guide movement of the mobile detection platform and define a distance between the mobile detection platform and the structure surface.

9. A modular wheeled mobile ultrasonic structure detection method, comprising the following steps:

providing the modular wheeled mobile ultrasonic structure detection apparatus according to claim 1;

pulling the modular wheeled mobile ultrasonic structure detection apparatus by the mobile carrier to enable the modular wheeled mobile ultrasonic structure detection apparatus to move on the structure surface, and adjusting a moving posture of the mobile detection platform by the steering balance mechanism to adapt to different structure surfaces;

performing ultrasonic detection on a structure defect through ultrasonic detection rollers installed with the ultrasonic sensors under a moving state, and transmitting ultrasonic waves through the ultrasonic transmission medium oil, to realize non-contact continuous acquisition of the ultrasonic waves between the ultrasonic sensors and the structure surface; and detecting signals of ultrasonic echo for identification of defects inside the structures.

* * * * *